US009746851B2

(12) United States Patent
Chai et al.

(10) Patent No.: US 9,746,851 B2
(45) Date of Patent: Aug. 29, 2017

(54) APPARATUS AND METHOD FOR TESTING AIRCRAFT MESSAGE TRIGGER LOGICS

(71) Applicant: Air China Limited, Beijing (CN)

(72) Inventors: Weixi Chai, Beijing (CN); Dechao Zhong, Beijing (CN); Xueliang Wu, Beijing (CN); Qixiang Li, Beijing (CN); Tang Li, Beijing (CN); Chengli Ouyang, Beijing (CN); Yuanbin Li, Beijing (CN); Wenjing Bi, Beijing (CN)

(73) Assignee: Air China Limited, Beijing (CN)

( * ) Notice: Subject to any disclaimer, the term of this patent is extended or adjusted under 35 U.S.C. 154(b) by 309 days.

(21) Appl. No.: 14/283,911

(22) Filed: May 21, 2014

(65) Prior Publication Data

US 2016/0203659 A1 Jul. 14, 2016

(30) Foreign Application Priority Data

May 22, 2013 (CN) .......................... 2013 1 01913046

(51) Int. Cl.
G05B 23/02 (2006.01)
G07C 5/08 (2006.01)
B64D 45/00 (2006.01)

(52) U.S. Cl.
CPC ......... *G05B 23/0256* (2013.01); *G07C 5/085* (2013.01); *G07C 5/0808* (2013.01); *G07C 5/0816* (2013.01); *B64D 45/00* (2013.01)

(58) Field of Classification Search
CPC .... G07C 5/0816; G07C 5/085; G07C 5/0808; G07C 5/0841; G05B 23/0256; G05B 23/00; G05D 1/0055; B64D 45/00

See application file for complete search history.

(56) References Cited

U.S. PATENT DOCUMENTS 4,155,116 A * 5/1979 Tawfik ............... G05B 23/0256
                                                244/194
4,470,116 A * 9/1984 Ratchford ............ G05D 1/0055
                                                360/5

(Continued)

FOREIGN PATENT DOCUMENTS

EP          0100746 A2    4/1983
JP       2002193194 A     7/2002

(Continued)

OTHER PUBLICATIONS

Sudolsky, M., "IVHM Solutions Using Commercially-available Aircraft Condition Monitoring Systems" IEEE Aerospace Conference paper #114, 8 pages (Mar. 3-10, 2007).

*Primary Examiner* — Abby Lin
(74) *Attorney, Agent, or Firm* — Brundidge & Stanger, P.C.

(57) ABSTRACT

According to various embodiments, the present invention relates to a platform and method for testing aircraft message trigger logics are disclosed. Apparatus for testing message trigger logics of aircraft comprises: DFDAU (a Digital Flight Data Acquisition Unit), which is adapted to receive message trigger logics to be tested; an input interface, which is adapted to receive data of aircraft condition; and a simulation signal generator, which is adapted to generate simulation signals according to the data of aircraft condition; wherein, the DFDAU is adapted to receive the simulation signals, and generate messages according to the message trigger logics to be tested.

22 Claims, 9 Drawing Sheets

(56) References Cited

U.S. PATENT DOCUMENTS

| | | | | |
|---|---|---|---|---|
| 5,023,791 A | * | 6/1991 | Herzberg | G05B 23/0283 324/73.1 |
| 5,260,874 A | * | 11/1993 | Berner | G09B 9/24 434/242 |
| 5,638,383 A | * | 6/1997 | Wotzak | B64G 1/22 702/118 |
| 2008/0269982 A1 | * | 10/2008 | Bailly | G05B 23/0213 701/33.4 |
| 2009/0281756 A1 | * | 11/2009 | Weed | G01P 21/00 702/104 |
| 2011/0043369 A1 | * | 2/2011 | Knoop | G01R 31/008 340/662 |
| 2012/0130585 A1 | * | 5/2012 | Declety | G07C 5/085 701/31.7 |

FOREIGN PATENT DOCUMENTS

| | | |
|---|---|---|
| JP | 2002207611 A | 7/2002 |
| JP | 2008514117 A | 5/2008 |
| JP | 2010538338 A | 12/2010 |
| JP | 2015530001 A | 10/2015 |

* cited by examiner

APPARATUS AND METHOD FOR TESTING AIRCRAFT MESSAGE TRIGGER LOGICS

TECHNICAL FIELD

The present invention relates to a test apparatus and test method, in particular to a test platform and test process for trigger logics of aircraft messages.

BACKGROUND ART

In order to monitor conditions of an aircraft, a large number of sensors are mounted on the aircraft. Those sensors detect and collect massive data of aircraft condition such as acceleration, air speed, altitude, airfoil configurations, external temperature, cabin temperature and pressure, engine performance and so on. The important component on an aircraft for collecting and processing data of aircraft condition is DFDAU (Digital Flight Data Acquisition Unit). All data of aircraft conditions collected by sensors or transmitted from relevant devices are sent at least to DFDAU of the aircraft.

DFDAU is an integrated airborne data acquisition and processing system. At first, DFDAU comprises a data acquisition subsystem, which is used for collecting real-time data of aircraft condition from each sensor on an aircraft, and converting the obtained data into digital signals and storing the same into QAR (Quick Access Recorder), a data recorder of aircraft condition. Second, DFDAU also comprises a data processing subsystem, such as ACMS (Aircraft Condition Monitoring System). ACMS is capable of monitoring aircraft condition according to data collected by DFDAU in a real-time manner. When certain trigger logic is satisfied, ACMS generates a corresponding message. A message may contain certain data of aircraft condition.

Messages can be displayed by an airborne display, printed by an airborne printing device, or stored in data disk so as to be used by flight crew or maintenance personnel during a stop over or after a flight. Messages can also be transmitted via airborne ACARS (Aircraft Communication Addressing and Reporting System) to ground SITA receiving station by using VHF, HF, satellite transceiver and other devices, and be transmitted to a terminal computer of an airline company.

A message is triggered by a threshold value of a certain parameter of aircraft condition or combinational logic of multiple parameters of aircraft condition. Such logic is referred to as message trigger logic. The message trigger logic has to undergo strict test before determining whether it can work with accuracy and high efficiency. For those traditional test methods, after the trigger logic and a message have been decided, they have to be loaded into an aircraft in operation and wait for occurrence of a specific event which triggers the logic and generate the message. And, one can then test whether the trigger logic and message are correctly written. However, the probability that the anticipated event repeatedly occurs is unpredictable. It might take several months to several years to test the accuracy of the trigger logic or a message, which is hard to accept. Therefore, there is a need in the field an independent test platform that allows test of message triggers of aircraft in a virtual environment.

SUMMARY

In response to the technical problem existing in prior art, the present invention provides, according to one aspect of the present invention, an apparatus for testing message trigger logics of aircraft, comprising: DFDAU (Digital Flight Data Acquisition Unit), which is adapted to receive a message trigger logic to be tested; an input interface, which is adapted to receive data of aircraft condition; and a simulation signal generator, which is adapted to generate simulation signals according to the data of aircraft condition; wherein, the DFDAU is adapted to receive the simulation signals and generate a message according to the message trigger logic to be tested.

According to another aspect of the present invention, the present invention provides a process for testing message trigger logics of aircraft, wherein the message trigger logic in the DFDAU is tested on the apparatus for testifying message trigger logics of aircraft, and the process comprises: loading data of aircraft condition constructed by oneself in accordance with aviation communicate standard or from QAR, wherein the data of aircraft condition may trigger the message trigger logic; generating simulation signals by using the data of aircraft condition on the test apparatus, and sending the simulation signals into DFDAU; and determining whether the message trigger logic is correctly triggered according to the message generated by DFDAU.

DESCRIPTION OF DRAWINGS

The preferred embodiments of the present invention will be described below in more details, taken in conjunction with the drawings, wherein.

DETAILED DESCRIPTION OF THE INVENTION

In order to present a clearer picture of the purposes, technical solutions and merits of the present invention, the technical solutions in the embodiments of the present invention will be further describe, taken in conjunction with the drawings in the embodiments of the present invention. Obviously, the illustrated embodiments are only a part of the invention rather than all of the embodiments of the present invention. Based on the embodiments of the present invention, all other embodiments that persons skilled in the art obtain without paying any creative effort shall fall within the protection scope of the present invention.

Figure 1:
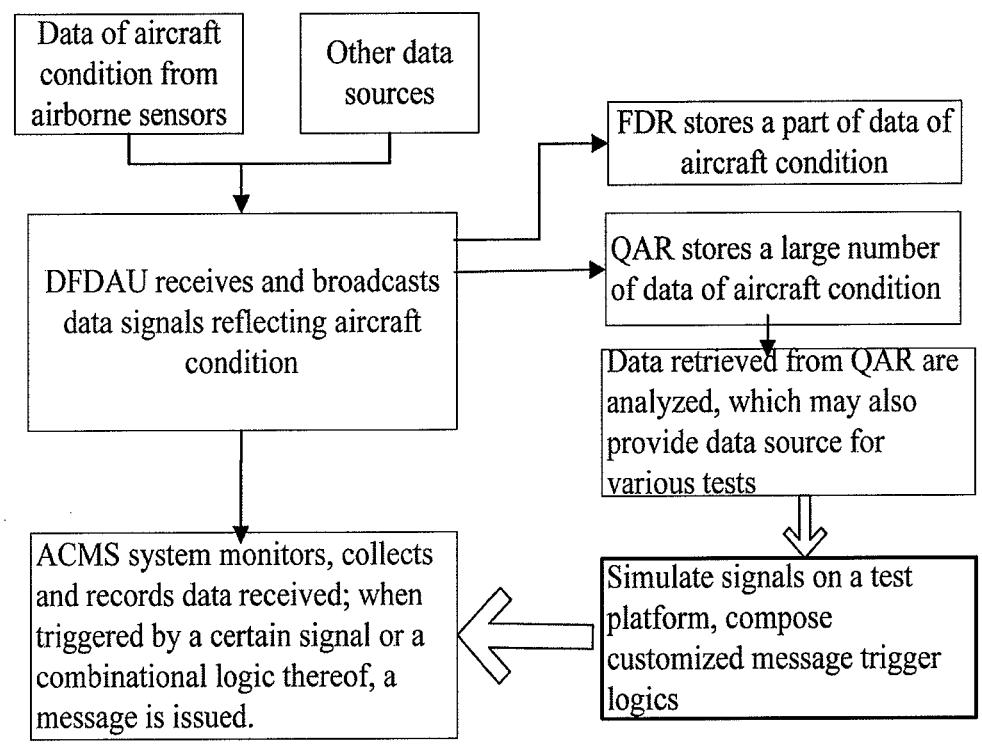
FIG. 1 is a schematic of fundamental for triggering messages according one embodiment of the present invention.

FIG. 1 is a schematic of the fundamental for triggering messages according to one embodiment of the present invention. As shown in FIG. 1, DFDAU (Digital Flight Data Acquisition Unit) receives data of aircraft condition from airborne sensors or other devices. Data acquisition subsystem of DFDAU converts the obtained data of aircraft condition into digital signals to be broadcast. QAR (Quick Access Recorder) receives and stores the broadcast data of aircraft condition. Among them, a part of data is stored in FDR (Flight Data Recorder), namely the "Black Box", so as to be analyzed by relevant personnel after emergency happened to the aircraft.

ACMS (Aircraft Condition Monitoring System) also receives broadcast data of aircraft condition from data acquisition subsystem of DFDAU. ACMS monitors, collects and records data of aircraft condition, and outputs predetermined data of aircraft condition under certain trigger conditions so as to be used for flight crew and maintenance personnel to monitor status and performance of aircraft. It is referred to as message since its data content and format can be changed by users.

ACMS messages are generated under the control of integrated application software. A message is triggered by threshold value of certain parameters of aircraft condition or combinational logic of multiple certain parameters of aircraft condition, namely, certain message trigger logic. The ACMS messages generated by message trigger logics designed and tested by producers of ACMS are referred to as basic messages. Many basic messages have already become a standard stipulated by civil aviation administrative department. Taking Boeing 737NG aircraft as an example, the ACMS basic messages it uses are about 20 messages.

Customized messages can be produced by writing ACMS message trigger logics by oneself. Customized messages may allow persons skilled in the art get rid of the limitation of parameters in basic messages, and directly deal with thousands of parameters of aircraft condition, through which aircraft condition can be better monitored. Meanwhile, for daily maintenance of aircraft, predictive maintenance strategy can be provided according to information of aircraft condition in the customized messages and thus condition-based maintenance of aircraft can be achieved.

New ACMS message trigger logic shall undergo strict test before they can be applied on aircraft. As shown in FIG. 1, after message trigger logics of customized messages have been written in the ACMS system of DFDAU, the DFDAU containing the message triggering logics of customized messages can then be tested on a test platform according to embodiments of the present invention.

The test platform of the present invention uses simulation signals to test a message trigger logic. Those simulation signals may come from real data of aircraft condition, in particular data of aircraft conditions retrieved from QAR after a flight, through which the real aircraft conditions can be "reproduced". Since, the DFDAU on the test platform of the present invention is totally the same with the DFDAU mounted on aircraft, and the test environment is also completely identical to environment in aircraft, the reliability of the test is guaranteed.

QAR data are often used for analysis and statistics of flight condition of aircraft, and may also serve as a data source from various test. Therefore, QAR data are also feasible data for testing message trigger logics. On the other hand, data of aircraft conditions composed according to aircraft data criterion can also be available test data. As such, one can compose data of aircraft conditions specific to a certain event, and realize the test of message trigger logic for the certain event without waiting for the real occurrence of the event. As a result, the test of message trigger logics of customized messages may be more convenient and efficient.

Figure 2:
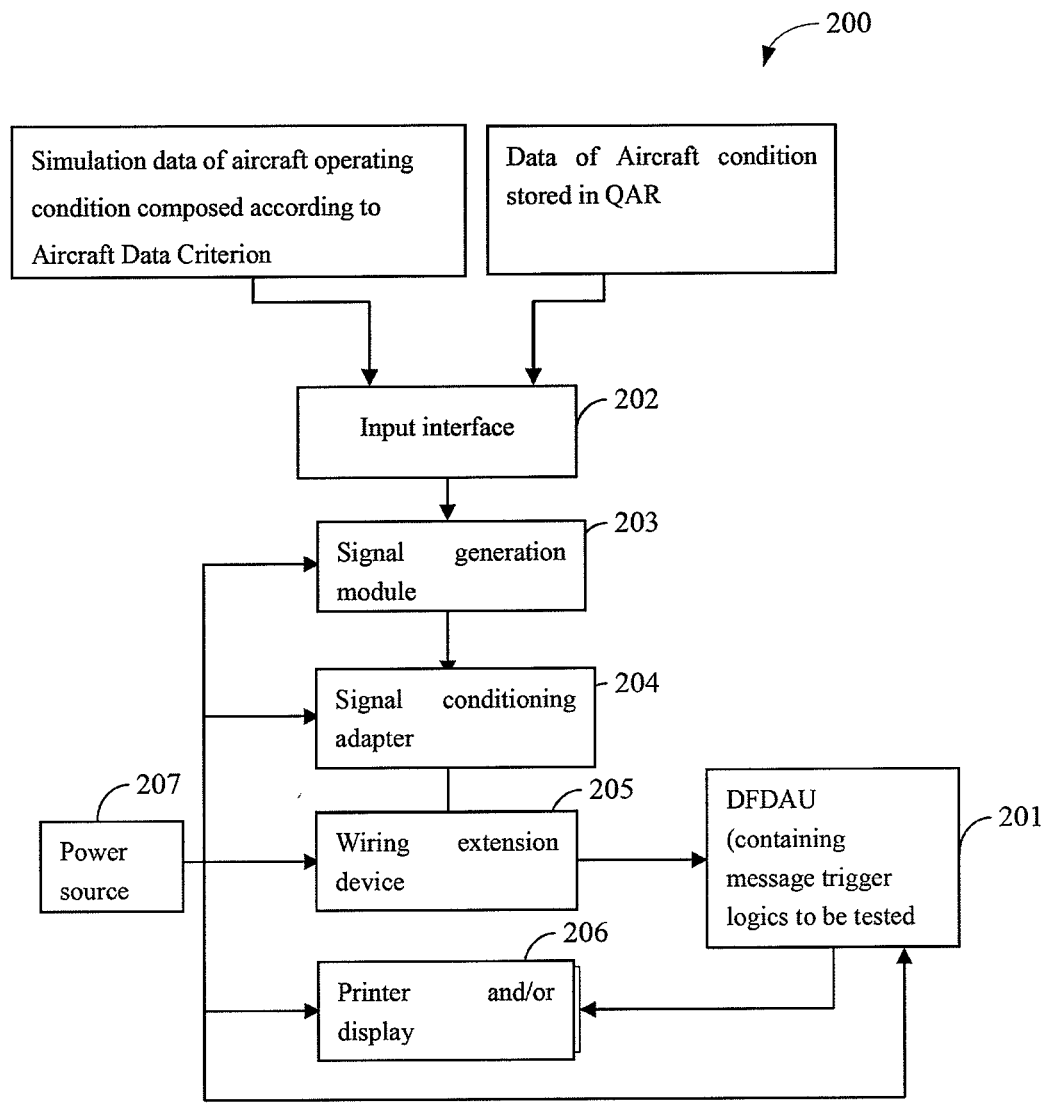
FIG. 2 is a structural schematic of a platform for testing the efficiency of a message trigger logic of aircraft according to one embodiment of the present invention.

FIG. 2 is a structural schematic of a test apparatus for testing message trigger logics of aircraft according to one embodiment of the present invention. The test apparatus 200 as shown in FIG. 2 comprises DFDAU 201 (Digital Flight Data Acquisition Unit). DFDAU 201 contains the message trigger logic to be tested. According to one embodiment of the present invention, the message trigger logic to be tested can be loaded into DFDAU via a data loader.

In an aircraft, inputs of DFDAU are aircraft signals collected by sensors of aircraft and data transmitted from other assemblies of aircraft condition. In order to exactly reproduce signal environment on an aircraft, the inputs of DFDAU of the test apparatus of the present invention are simulation signals generated from signal generation module. According to one embodiment of the present invention, the type and property of those simulation signals are exactly the same with those of aircraft signals collected by aircraft sensors and data transmitted from other assemblies of aircraft condition.

According to one embodiment of the present invention, DFDAU of the test apparatus may be an apparatus of 2233000-8XX produced by Teledyne company, of 967-0212-XXX produced by HoneyWell company, or of 261303879-XXXX produced by Sagem company, wherein, "X . . . " refers to specific types.

In this description, apart from DFDAU produced by the above specific producers, "DFDAU" also comprises apparatuses having similar functions. Specifically, DFDAU comprises a data acquisition subsystem, which is used for collecting real-time data of aircraft condition and control signals from each sensor of aircraft, and converting the obtained data into digital signals. Alternatively, DFDAU also comprises a data processing subsystem, which realizes certain logic processing and output functions according to data of aircraft condition and control signal data obtained by data acquisition subsystem.

According to one embodiment of the present invention, simulation signals input into DFDAU on the test apparatus of the present invention involves multiple systems of aircraft, comprising: airframe structure, engine, aviation electronic system, electromechanical system, hydraulic pressure, fuel oil, loop control, maneuvering system and so forth. Various types of signals are involved, comprising: analog signal, discrete signal, bus signal specific to aviation and so forth; and those signals are interrelated in time and value of quantity.

According to one embodiment of the present invention, data source of simulation signals of signal generation module, namely test data, comprises two types: one is simulation data of flight operating condition written according to aircraft data criterion, and the other is data of aircraft condition stored on airborne QAR (Quick Access Recorder). According to one embodiment of the present invention, the occurrence of various events can be better simulated and reproduced by using simulation data of flight operating condition written according to aircraft data criterion. Since the operation of aircraft requires high reliability, and the probability of the occurrence of a certain event during the operation of an aircraft is unpredictable, the efficiency of the test will be greatly improved by using simulation data written according to aircraft data criterion, through which any value of any signal and combination of any signals can be provided and the occurrence of certain event can be controlled by people.

According to one embodiment of the present invention, accuracy and reliability of the test result can be improved by using real data of aircraft condition stored in airborne QAR to fully reproduce real environment of aircraft.

According to one embodiment of the present invention, for data of aircraft condition reflecting a certain event, it is used to repeatedly test its trigger logic for triggering certain message on the test apparatus of the present invention, and to make proper adjustment until the best message trigger logic is found.

According to one embodiment of the present invention, it is required that a customized message trigger logic can work with both real data of aircraft operating condition written according to aircraft data criterion and real data of aircraft condition stored in QAR.

As shown in FIG. 2, test apparatus of the present invention comprises an input interface 202 for inputting data of aircraft condition. According to one embodiment of the present invention, input device may be bus interface, wired network interface, USD interface, wireless network interface, Bluetooth interface and so forth. Persons skilled in the art shall appreciate that any means that can realize data input may be used for the configuration of input interface of the test apparatus.

According to one embodiment of the present invention, test data is connected to signal generation module 203 through a data-based bus system via input interface. Those data buses are data buses, comprising but not limited to PXI bus, PCI bus, PCIE bus, VXI bus and so forth.

According to one embodiment of the present invention, the test apparatus further comprises signal conditioning adapter 204. The signal conditioning adapter 204 further manipulates simulation signals generated by signal generation module of the data-based bus system, such as amplification or attenuation, isolation, multiplexing and so forth, so as to ensure quality and stability of signals and meet the requirement of high accuracy of signals of data of aircraft condition.

According to one embodiment of the present invention, the test apparatus further comprises wiring extending device 205. Before the manipulated signals are input into DFDAU, a wiring extending device is used to increase choice of input and form a connection selectable wiring device. According to one embodiment of the present invention, the wiring extending device comprises different zones, with each zone specific to one type of signals. As such, connectors on the wiring extending device for inputting various signals are obvious, easy to manage and convenient for realizing logical combinations of various signals.

After being manipulated, simulation signals generated by signal generation module are input into the wiring extending device and then enter into DFDAU so as to simulate working environment during the operation of aircraft in DFDAU. When a message trigger logic is satisfied, ACMS system will issue a corresponding message which is displayed and printed by output device of the test apparatus. One can determine whether the message trigger logic works by examining the displayed or printed message, and thus realizing test of message trigger logic.

According to one embodiment of the present invention, the test apparatus comprises a printer and/or a display 206. According to one embodiment of the present invention, the printer and/or display of the test apparatus are for the exclusive use of aviation. The aviation-specific printing and/or displaying device receive and decode output of DFDAU, and print and/or display the message output by DFDAU to be examined and used by operation staff. According to one embodiment of the present invention, printing device of the test apparatus is a virtual printer. According to one embodiment of the present invention, the printer and/display of the test apparatus may be an independent printer and/or display separated from other elements of the test apparatus.

According to one embodiment of the present invention, the test apparatus comprises a power source 207. The power source is used to supply stable direct current or alternating current voltage needed for the test apparatus. For example, a power source supplies an alternating current voltage of 5V and 400 Hz.

Figure 3:
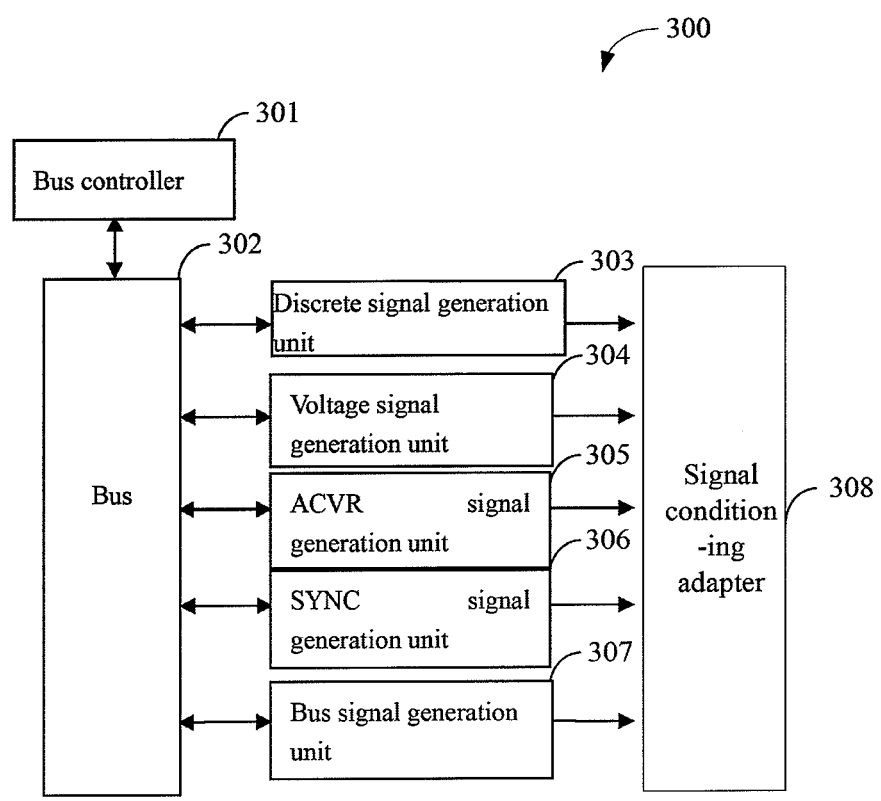
FIG. 3 is a structural schematic of a simulation signal generation module according to one embodiment of the present invention.

FIG. 3 is a structural schematic of simulation signal generation module according to one embodiment of the present invention. As shown in FIG. 3, simulation signal generation module 300 in the present embodiment integrates multiple simulation signal generation units. According to one embodiment of the present invention, after the input of test data, the test data are connected to each simulation signal generation units of simulation signal generation module via data bus system 302 under the control of bus controller 301 in the test apparatus.

According to one embodiment of the present invention, by using the data acquisition processing system with open structure of PXI bus, signals are obtained and controlled via various interface boards on the platform of bus technology. Wherein, PXI bus is an open, modularized instrumental bus with high performance and low cost issued by American National Instruments Company (NI). Persons skilled in the art shall appreciate that PXI bus is illustrated only as an alternative embodiment. Other type of data buses can also be applied in the solutions of the present invention.

According to one embodiment of the present invention, simulation signal generation units integrated in simulation signal generation module comprises discrete signal generation unit 303, voltage signal generation unit 304, analog signal generation unit and bus signal generation unit 307.

According to one embodiment of the present invention, discrete signal generation unit comprises on/off signal generation unit; analog signal generation unit comprises: alternating current voltage ratio signal ACVR generation unit 305, and SYNC signal generation unit 306; bus signal generation unit comprises ARINC429 bus signal generation unit, and ARINC619 bus signal generation unit.

According to one embodiment of the present invention, on/off generation unit comprises high density general-purpose relay matrix, which is configured to simulate on/off signals of hundreds of channels, such as high density general-purpose single pole single throw relay card. According to one embodiment of the present invention, on/off generation unit comprises digital switch array.

According to one embodiment of the present invention, voltage signal generation unit comprises quiescent voltage output board card, simulation LLDC (Low Level Direct Current) signals. According to one embodiment of the present invention, voltage signal generation unit may be PXI-6704 multi-functional quiescent voltage output board card produced by NI Company.

According to one embodiment of the present invention, digital signal generation unit under ARINC429 standard comprises 429 bus board card. According to one embodiment of the present invention, 429 bus board card may be ACX429 board card produced by AIM Company.

According to one embodiment of the present invention, digital signal generation unit under ARINC619 comprises 619 bus board card. According to one embodiment of the present invention, 619 bus board card may be ACX619 board card produced by AIM Company.

Figure 4:
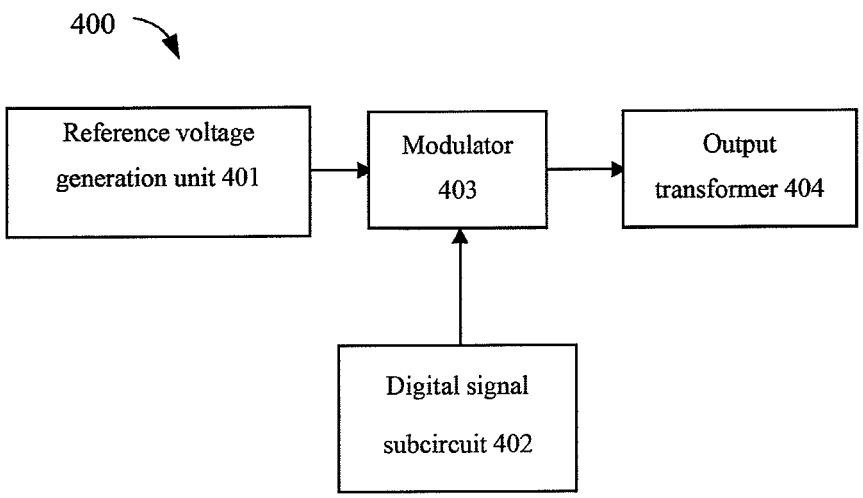
FIG. 4 is a structural schematic of an alternating current voltage ratio (ACVR) signal generation unit according to one embodiment of the present invention.

FIG. 4 is a structural schematic of an alternating current voltage ratio ACVR signal generation unit according to one embodiment of the present invention. As shown in FIG. 4, ACVR signal generation unit 400 comprises an alternating current voltage signal conversion unit 401, which is connected to a power source to convert an alternating current voltage signal of 115V 400 Hz into a reference alternating current voltage signal of 26V 400 Hz. Specifically, alternating current voltage conversion unit 401 generates a required reference alternating current voltage signal by converting frequency and/or voltage of an alternating current voltage signal provided by a power source. ACVR signal generation unit 400 further comprises digital signal subcircuit 402 and modulator 403. Digital signal subcircuit 402 is used for receiving digital signals from bus system. Modulator 403 receives reference alternating current voltage signals from alternating current voltage signal conversion unit 401 and digital signals, modulates the reference alternating current voltage signals according to the digital signals, and converts the reference alternating current voltage signals into alternating current voltage ratio signals. ACVR signal generation unit 400 further comprises an output transformer 404, which outputs the generated alternating current voltage ratio signals.

Figure 5:
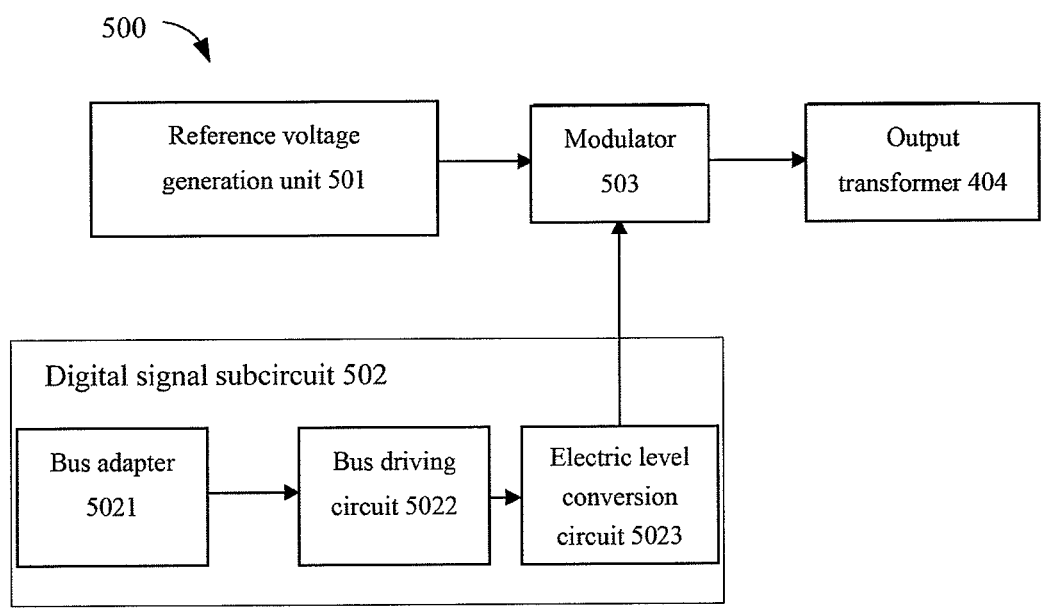
FIG. 5 is a structural schematic of an alternating current voltage ratio (ACVR) signal generation unit according to another embodiment of the present invention.

FIG. 5 is a structural schematic of an alternating current voltage ratio signal ACVR signal generation unit according to one embodiment of the present invention. As shown in FIG. 5, ACVR signal generation unit 500 comprises an alternating current voltage signal conversion unit 501, which generates an alternating current voltage signal of 26V 400 Hz by converting frequency and/or voltage of the alternating current voltage signal of a power source.

ACVR signal generation unit 500 also comprises a digital signal subcircuit 502, modulator 503, and output transformer 504. Digital signal subcircuit 502 further comprises a bus adapter 5021, a bus driving circuit 5022 and a voltage level conversion circuit 5023. Bus adapter 5021 is connected to an external bus system to obtain digital signals from the external bus. Bus driving circuit 5022 is used to drive the digital signals. Voltage level conversion circuit 5023 converts voltage level of the digital signals into a voltage level required by modulator 503. Modulator 503 receives reference alternating current voltage signals from alternating current voltage signal conversion unit 501, and modulates amplitude of reference alternating current voltage signals according to the digital signals from data bus input by digital signal subcircuit, and generates corresponding alternating current voltage ratio signals. Output transformer 504 outputs the alternating current voltage ratio signals.

For example, pressure value of a stand-by hydraulic pressure in an aircraft is represented by alternating current voltage ratio signal. In order to simulate the signal, modulator 503 modulates reference voltage signal via the following equation:

$$Up(AC)=26(-0.49E-5\ Pressure+0.5985);$$

Wherein, Up (AC) is the valid value of an alternating current voltage signal; Pressure is an input pressure value, which is 0-4000 PSI. As such, by inputting pressure value via a bus system, ACVR signal generation unit 500 may simulate the alternating current voltage ratio signal of the pressure value of a standby hydraulic pressure of an aircraft within a scope of 0-4000 PSI.

In theory, ACVR signal generation unit can be regarded as a D/V conversion unit from digital signal to alternating current voltage ratio signal. Therefore, other circuit or combination of circuits that can achieve this function may also be applied in realizing the ACVR signal generation unit of the present application.

Figure 6:
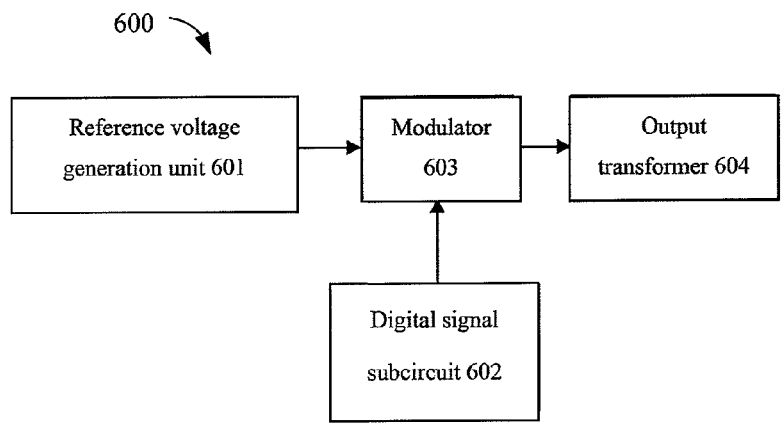
FIG. 6 is a structural schematic of an alternating current voltage sync signal generation unit according to one embodiment of the present invention.

FIG. 6 is a schematic of a sync signal generation unit according to one embodiment of the present invention. Sync signal is also referred to as shaft angle signal. As shown in FIG. 6, sync signal generation unit comprises an alternating current voltage signal conversion unit 601, which is connected to a power source for converting alternating current voltage signals into the required two groups of reference alternating current voltage signals; digital signal subcircuit 602, which receives digital signals from bus system; modulator 603 which receives the alternating current voltage sync signals and digital signals and converts the digital signals into alternating current voltage sync signals; and output transformer 604, which outputs the generated sync signals.

Figure 7:
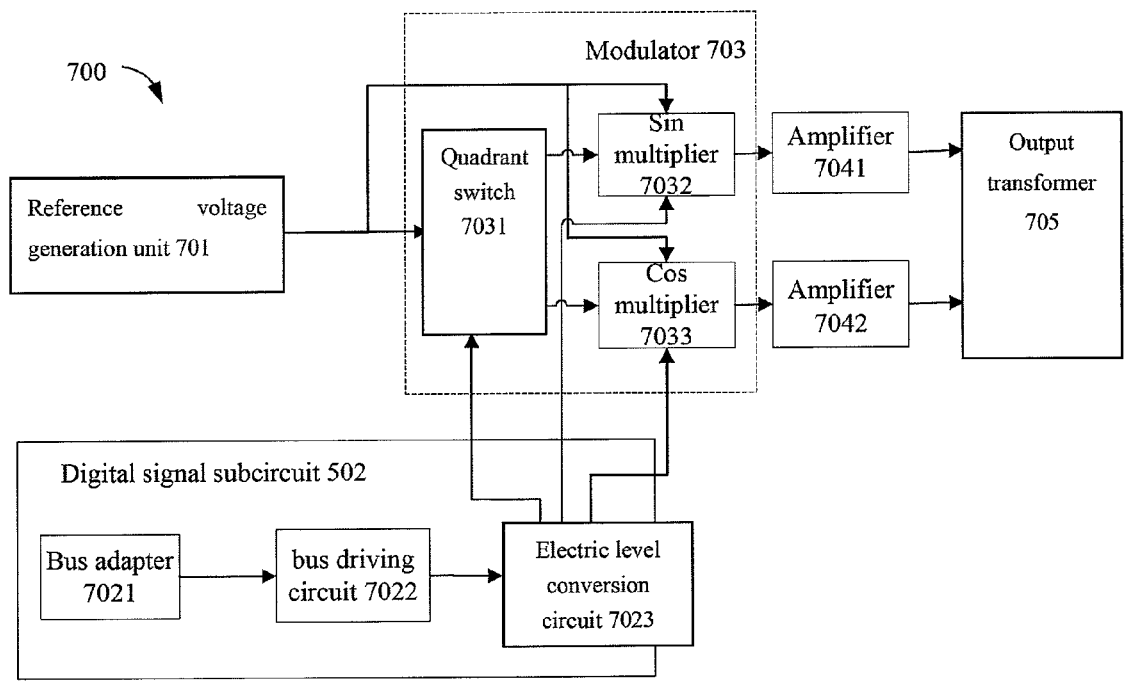
FIG. 7 is a structural schematic of an alternating current voltage sync signal generation unit according to another embodiment of the present invention.

FIG. 7 is a structural schematic of an alternating current voltage sync signal generation unit according to one embodiment of the present invention. As shown in FIG. 7, sync signal generation unit 700 comprises an alternating current voltage signal conversion unit 701, which is connected to a power source to convert an alternating current voltage signal of 115V 400 Hz into two groups of reference alternating current voltage signals of 28V 400 Hz.

Sync signal generation unit 700 also comprises a digital signal subcircuit 702 and modulator 703. Digital signal subcircuit 702 comprises a bus adapter 7021, a bus driving circuit 7022 and a voltage level conversion circuit 7023. Bus adapter 7021 is connected to an external bus system for obtaining digital signals from the external bus. Bus driving circuit 7022 is used to drive the digital signals. Voltage level conversion circuit 7023 modulates voltage level of the digital signals into a voltage level required by modulator 703.

Modulator 703 of the sync signal generation unit comprises a quadrant switch 7031, sin multiplier 7032 and cos multiplier 7033. Two groups of alternating current voltage signals pass through the quadrant switch 7031 and enter into sin multiplier 7032 and cos multiplier 7033. The first two bits of a digital signal from the external bus represent quadrant of an angle, and the rest part represents an angle from 0-90 and thus represents an angle value from 0 to 360. The first two bits of the digital signal are input into quadrant switch 7031, while the rest part is input into sin multiplier 7032 and cos multiplier 7033. After the two groups of alternating current voltage signals pass through sin multiplier 7032 and cos multiplier 7033, the different between phases the above two signals may represent the angle value.

Sync signal generation unit 700 further comprises amplifiers 7041 and 7042 for amplifying power of the signals output by sin multiplier 7032 and cos multiplier 7033; and output transformer 705 for outputting the sync signals. As such, shaft angle signal is simulated. According to one embodiment of the present invention, the above modulator can be achieved via a four-quadrant multiplier.

In theory, sync signal generation unit can be regarded as a D/A conversion unit from digital signal to alternating current voltage sync signal. Therefore, other circuit or combination of circuits that can achieve this function can also be applied in realizing the sync signal generation unit of the present application.

Figure 8:
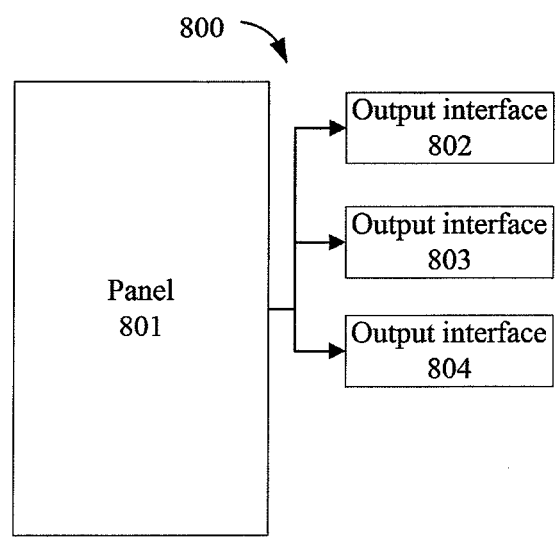
FIG. 8 is a structural schematic of a patch board according one embodiment of the present invention.

According to one embodiment of the present invention, wiring extending device comprises a wiring board. FIG. 8 is a structural schematic of a wiring board according to one embodiment of the present invention. As shown in the figure, wiring board 800 comprises: a wiring board panel 801 and multiple output interfaces 802-804. According to one embodiment of the present invention, wiring board 801 comprises multiple sockets, with each socket able to be communicatively connected to signal output of one circuit of the simulation signal generation module. Each output interface corresponds to one type of signals, and is connected to corresponding type of input interface of DFDAU. Each output interface comprises multiple output terminals, with each output terminal corresponding to one socket of the wiring board 801.

Figure 9:
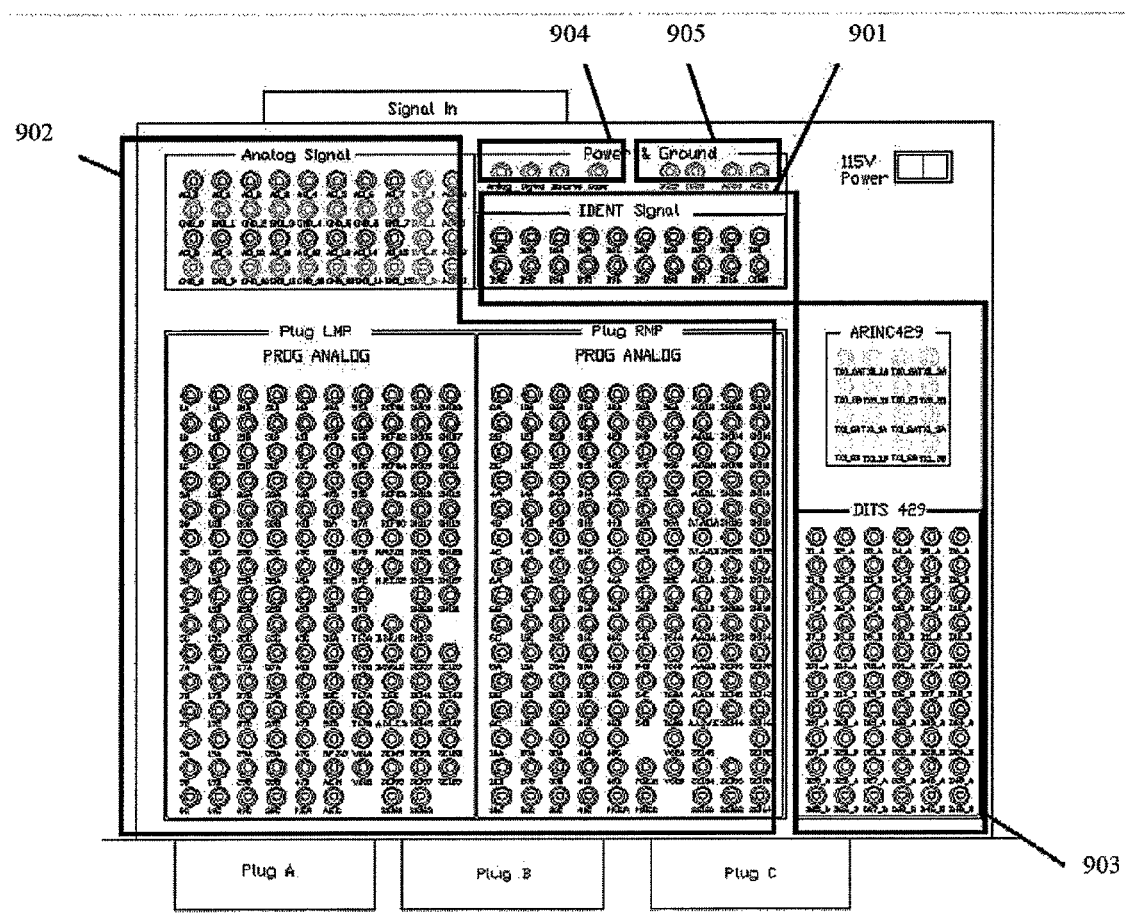
FIG. 9 is a structural schematic of a patch board panel according to one embodiment of the present invention.

FIG. 9 is a schematic of a wiring board panel according to one embodiment of the present invention. As shown in FIG. 9, wiring board panel comprises multiple zones: aircraft type choosing zone 901, analog signal zone 902, and bus signal zone 903. Through allocating different types of signals into different zones, it is convenient for test personnel to administer the test signals. Besides, test personnel may complete logic combinations of test signals of various types via the wiring board, and simulates situations of collecting data signal of aircraft condition in real environment. The wiring board panel further comprises power connecting zone 904 and ground connecting zone 905.

According to one embodiment of the present invention, the wiring board may alternatively comprises an automatic switchover module. Input signals from wiring board panel 801 are connected to input end of automatic switchover module, and output end of automatic switchover module is connected to multiple output interfaces 802-804. Automatic switchover module realizes automatic switchover between input signals of each circuit of the wiring board panel 801 and each output terminal of multiple output interfaces 802-804. By using automatic switchover module, there is no need for operation staff to manually switch signals of each circuit on the wiring board panel 801 and it remarkably facilitates the test operation.

According to another embodiment of the present invention, the wiring extending device comprises an automatic switchover module, an input interface and an output interface. The input interface comprises multiple input terminals, with each input terminal capable of being communicatively connected to a signal transmission device of aircraft of a certain type. The output interface comprises multiple output terminals, with each output terminal corresponding to one input terminal of the input interface. The automatic switchover module of the wiring extending device is used for automatic switchover between input signals of each circuit and each output terminal of the multiple output interfaces on the wiring board panel.

According to one embodiment of the present invention, automatic switchover module may comprise switch matrix arranged in rows and columns, with all input signals forming each row and all output terminals forming each column. There is set a switch at each intersection of each row and column to form a switch array. Automatic switchover between input signals and output terminals can be realized by controlling those switches in the switch array.

According to one embodiment of the present invention, the wiring board alternatively comprises, for example, a test module and a circuit scanning module of universal meter module. Since the wiring board comprises numerous connecting circuits between input and output ends, those connecting circuits may malfunction due to various reasons. It is a tedious and energy-consuming work to troubleshoot invalid circuits. By measuring current and voltage of connecting circuits, universal meter module may examine whether a connecting circuit is invalid. The circuit scanning module may automatically switch between each connecting circuit so as to connect the universal meter module to different connecting circuits. It is convenient to perform "self-examination" via the universal meter module and circuit scanning module, and to detect all invalid circuits.

Figure 10:
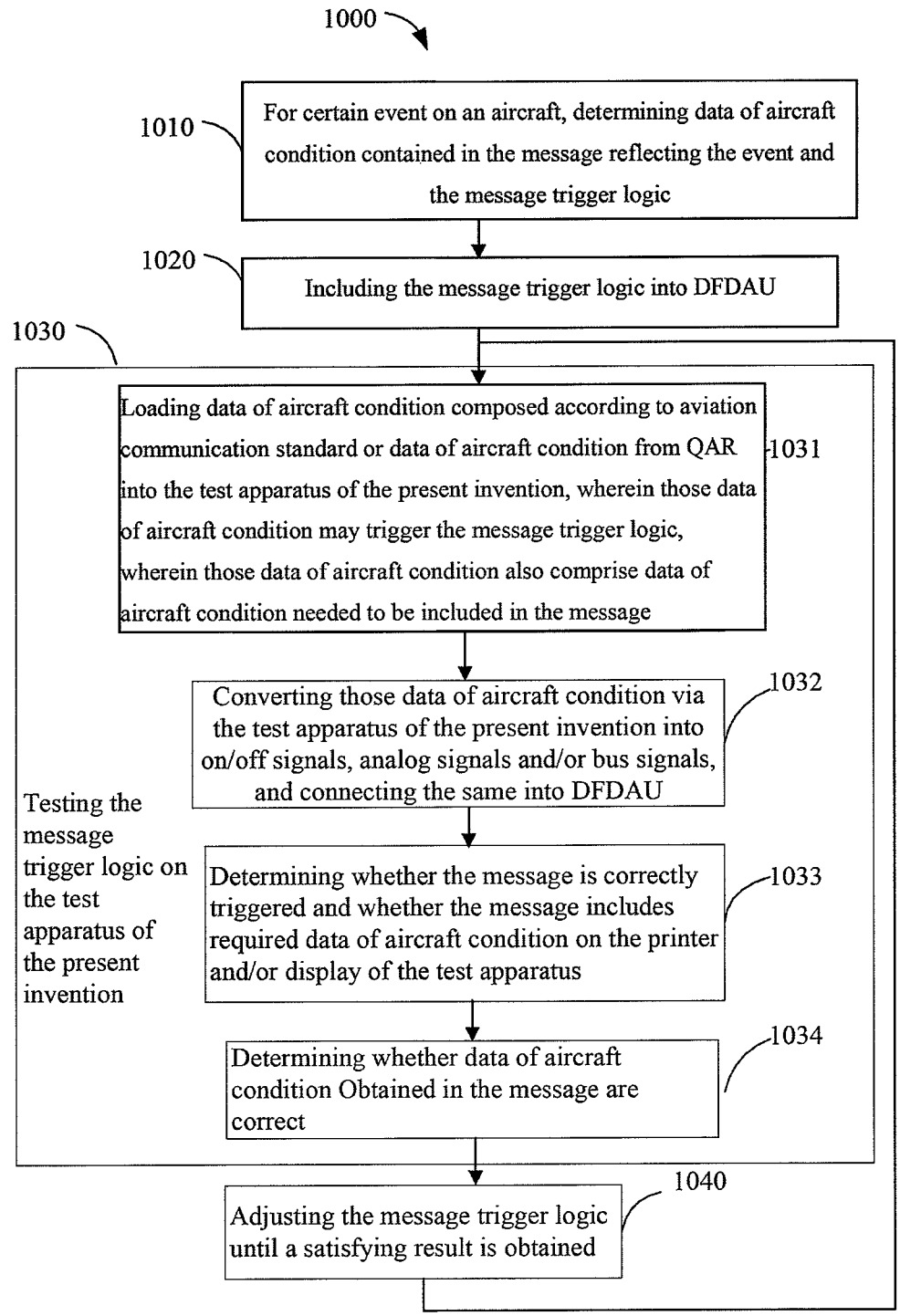
FIG. 10 is a flow chart of a process for testing message trigger logics of aircraft according to one embodiment of the present invention.

FIG. 10 is a flow chart of a process for testing message trigger logics of aircraft according to one embodiment of the present invention. As shown in the figure, in the test process 1000, in step 1010, for certain event on an aircraft, determining data of aircraft condition contained in the message reflecting the event and the message trigger logic; in step 1020, including the message trigger logic into DFDAU; in step 1030, testing the message trigger logic within DFDAU on the test apparatus of the present invention, wherein in step 1031, loading data of aircraft condition written according to aviation communication standard or data of aircraft condition from QAR into the test apparatus of the present invention, wherein those data of aircraft condition may trigger the message trigger logic, wherein those data of aircraft condition also comprise data of aircraft condition needed to be included in the message; in step 1031, converting those data of aircraft condition via the test apparatus of the present invention into on/off signals, analog signals and/or bus signals, and connecting the same into DFDAU; in step 1033, determining whether the message is correctly triggered and whether the message includes required data of aircraft condition on the printer and/or display of the test apparatus; in step 1034, determining whether the obtained data of aircraft condition in the message are correct; then, in step 1040, adjusting the message trigger logic until a satisfying result is obtained.

Step 1034 further comprises: determining whether the data of aircraft condition obtained in the message are identical to the data of aircraft condition constructed by oneself; or determining whether the data of aircraft condition obtained in the message are identical to the data of aircraft condition in the message generated on an airplane; or determining whether the data of aircraft condition obtained in the message are identical to the data of aircraft condition from QAR.

Figure 11:
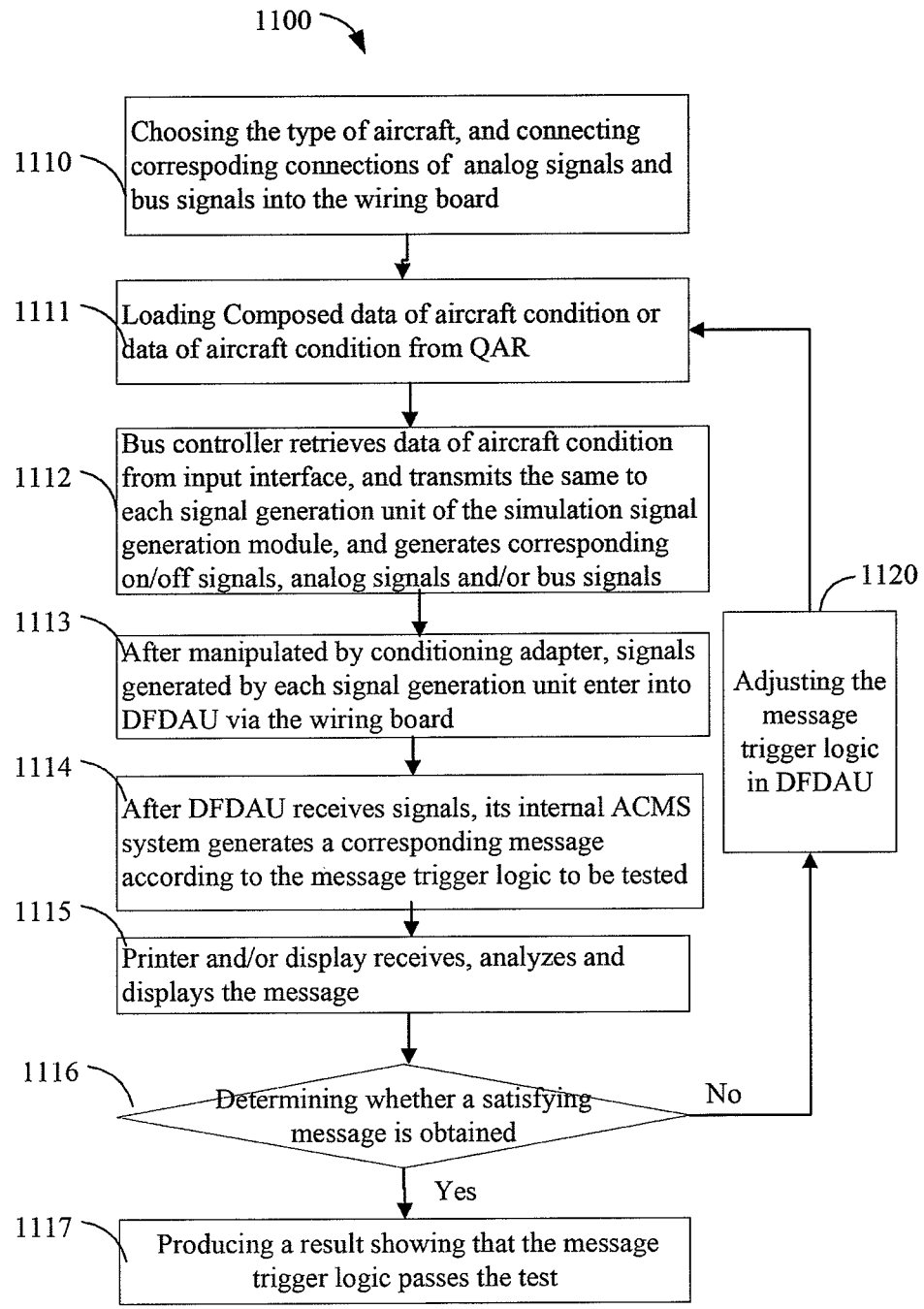
FIG. 11 is a flow chart of a process for testifying message trigger logics of aircraft on a test platform of the present invention according to one embodiment of the present invention.

FIG. 11 is a flow chart of a process for testing a message trigger logic of aircraft on a test apparatus of the present invention according to one embodiment of the present invention. As shown in FIG. 11, in test process 1100, in step 1110, choosing the type of aircraft on the wiring board, and connecting the required on/off signals, analog signals, and bus signals into the wiring board; in step 1111, loading data of aircraft condition written by oneself or data of aircraft condition from QAR. In step 1112, bus controller retrieves data of aircraft condition from input interface, and transmits the same to each signal generation unit of the simulation signal generation module, and generates corresponding on/off signals, analog signals and/or bus signals. In step 1113, after manipulated by conditioning adapter, signals generated by each signal generation unit pass through the wiring board into DFDAU. In step 1114, after DFDAU receives signals, its internal ACMS system generates a corresponding message according to the message trigger logic to be tested. In step 1115, printer and/or display receive, analyze and display the message. In step 1116, whether a satisfying message has been obtained is determined. If no satisfying message is obtained, then go to step 1120 to adjust the message trigger logic in DFDAU, and return to execute step 1112. If a satisfying message is obtained, then in step 1117 a result showing that the message trigger logic passes the test is obtained.

The test apparatus of the present invention fully reproduces data environment of aircraft. The test result on the test apparatus of the present invention is completely the same with the test result carried out on a real aircraft. Therefore, after being tested on the test apparatus of the present invention, a message trigger logic can be directly applied on an aircraft. The test apparatus and method of the present invention realize rapid and accurate test of message trigger logics. Therefore, operation staff can monitor aircraft condition more accurately, ensure flight safety and realize condition-based maintenance of aircraft.

The foregoing embodiments are only for illustrative purpose, and not mean to limit scope of the present invention. Persons skilled in relevant art may make various variations and modifications without departing from scope of the present invention. Therefore, all equivalent technical solutions shall fall within scope disclosed by the present invention.

We claim:

1. A test apparatus, independent of an aircraft, for testing aircraft message trigger logic for the aircraft, comprising:
   a DFDAU (Digital Flight Data Acquisition Unit), which is configured to receive message trigger logic to be tested, wherein the message trigger logic is loaded onto the DFDAU;
   an input interface, which is configured to receive data of aircraft condition; and
   a simulation signal generator, which is connected to the input interface and configured to generate a simulation signal according to the data of aircraft condition, wherein a type and property of the simulation signal is identical to those of aircraft signals collected by aircraft sensors and data transmitted from other assemblies of aircraft condition;
   wherein, the DFDAU is further configured to receive the simulation signal and generate a message according to the message trigger logic to be tested based on the simulation signal;
   wherein the simulation signal generator comprises at least one of a discrete signal generation unit, a voltage signal generation unit, an analog signal generation unit or a bus signal generation unit;
   wherein the input interface is connected to at least one of the discrete signal generation unit, the voltage signal generation unit, the analog signal generation unit or the bus signal generation unit via a bus system; and
   a wiring extension device comprising a wiring board.

2. The test apparatus according to claim 1, wherein the data of aircraft condition comprise data of aircraft condition composed according to aviation communication criterion.

3. The test apparatus according to claim 1, wherein the data of aircraft condition comprise data of aircraft condition from QAR (Quick Access Recorder).

4. The test apparatus according to claim 1, wherein the discrete signal generation unit comprises an on/off signal generation unit.

5. The test apparatus according to claim 4, wherein the on/off signal generation unit comprises a relay array or a switch array.

6. The test apparatus according to claim 1, wherein analog signal generation unit comprises an alternating current voltage ratio (ACVR) signal generation unit, the ACVR signal generation unit comprises:
   an alternating current voltage signal conversion unit, which is adapted to be connected to a power source and generate alternating current voltage signals with valid value and frequencies;
   a digital signal subcircuit, which is configured to receive a digital signal;
   a modulator, which is configured to receive the alternating current voltage signals and the digital signal, and generate alternating current voltage ratio signals according to the digital signal; and
   an output transformer, which is configured to output the alternating current voltage ratio signals.

7. The test apparatus according to claim 6, wherein the digital signal subcircuit comprises:
   a bus adapter, which is configured to connect the bus system for receiving a digital signal from the bus system;
   a bus driving circuit, which is configured to drive the digital signal; and
   a voltage level conversion circuit, which is configured to convert voltage level of the digital signal into a voltage level required by the modulator.

8. The test apparatus according to claim 6, wherein the modulator modulates valid value of the alternating current voltage signals according to the digital signal input from the digital signal subcircuit and generates corresponding alternating current voltage ratio signals.

9. The test apparatus according to claim 1, wherein analog signal generation unit comprises a sync signal generation unit, the sync signal generation unit comprises:
   an alternating current voltage signal conversion unit, which is configured to be connected to a power source and generated two sets of alternating current voltage signals;
   a digital signal subcircuit, which is configured to receive input digital signals;
   a modulator, which is configured to convert the two sets of alternating current voltage signals into two sets of alternating current voltage signals having a phase difference, wherein the phase difference is based on the digital signal;
   a first and second amplifiers, which are configured to amplify power of the two sets of alternating current voltage signals having the phase difference; and
   an output transformer, which is configured to output amplified two sets of alternating current voltage signals having the phase difference.

10. The test apparatus according to claim 9, wherein the modulator comprises: a sin multiplier and a cos multiplier; wherein the two sets of alternating current voltage signals are input to the sin multiplier and the cos multiplier respectively and are converted into two sets of alternating current voltage signals having the phase difference.

11. The test apparatus according to claim 1, wherein the bus signal generation unit comprises ARINC429 bus signal generation unit, ARINC629 bus signal generation unit or a combination thereof.

12. The test apparatus according to claim 1, further comprises a signal conditioning adapter, which is configured to manipulate the simulation signals generated by the simulation signal generation module.

13. The test apparatus according to claim 1, wherein the wiring board comprises:

a wiring board panel, which comprises a plurality of sockets, each socket configured to be communicatively connected to an output signal of the simulation signal generator; and a plurality of output interfaces, each output interface comprising a plurality of output terminals, wherein each output terminal corresponds to a socket of the wiring board panel;

wherein each output interface of a signal type is connected to an input interface of a corresponding signal type of the DFDAU.

14. The test apparatus according to claim 13, the wiring board panel comprises: analog signal zone, bus signal zone, power connection zone, and ground connection zone.

15. The test apparatus according to claim 13, the wiring board comprises an automatic switchover module, which is configured to automatically switch each input signal of the wiring board panel and each output terminal of the plurality of output interfaces.

16. The test apparatus according to claim 1, wherein the wiring extension device further comprises an input interface and an output interface;

Wherein the input interface comprises a plurality of input terminals, each input terminal configured to be communicatively connected to an output signal of the simulation signal generator;

the output interface comprises a plurality of output terminals, each output terminal corresponding to an input terminal of the input interface;

wherein the wiring extension device further comprises an automatic switchover module which is configured to automatically switch each input terminal of the input interface and each output terminal of the output interface.

17. The test apparatus according to claim 15, wherein the automatic switch module comprises a switch array arranged in row and column.

18. The test apparatus according to claim 1, wherein the wiring extension device further comprises:

a test module, which is configured to examine whether a connection circuit is invalid by measuring current and voltage of the connection; and a circuit scanning module, which is configured to automatically switch between connections so as to connect the test module to different connections.

19. A method for testing aircraft message trigger logic, the method implemented by a test apparatus comprising:

a DFDAU (Digital Flight Data Acquisition Unit), which is configured to receive message trigger logic to be tested, an input interface, which is configured to receive data of aircraft condition, and a simulation signal generator, which is connected to the input interface and configured to generate a simulation signal according to the data of aircraft condition, wherein a type and property of the simulation signal is identical to those of aircraft signals collected by aircraft sensors and data transmitted from other assemblies of aircraft condition;

the method comprising:

loading the message trigger logic onto the DFDAU;

loading the data of aircraft condition composed according to aviation communication standard or data of aircraft condition from QAR, via the input interface, wherein the data of aircraft condition may trigger the message trigger logic to be tested;

generating, by the simulation signal generator, the simulation signal according to the data of aircraft condition, and connecting the simulation signal into the DFDAU;

generating, by the DFDAU, a message in response to the simulation signal connected to the DFDAU when data in the simulation signal triggers the message trigger logic; and determining whether the message trigger logic is correct according to the message generated by DFDAU.

20. The method according to claim 19, the process further comprises: determining whether the message is correctly triggered.

21. The method according to claim 19, wherein the message includes data regarding an aircraft condition, and wherein the method further comprises determining whether the data of aircraft condition obtained in the message are the same with the data of aircraft condition from QAR.

22. The method of claim 21 further comprises: adjusting the message trigger logic.

* * * * *